United States Patent
Bolte et al.

(10) Patent No.: US 6,809,171 B2
(45) Date of Patent: Oct. 26, 2004

(54) MONOMER-POOR POLYURETHANE BONDING AGENT HAVING AN IMPROVED LUBRICANT ADHESION

(75) Inventors: Gerd Bolte, Monheim (DE); Markus Kruedenscheidt, Langenfeld (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 10/137,884

(22) Filed: May 2, 2002

(65) Prior Publication Data

US 2003/0065125 A1 Apr. 3, 2003

Related U.S. Application Data

(63) Continuation of application No. 09/744,087, filed as application No. PCT/EP99/04890 on Jan. 19, 2001, now abandoned.

(30) Foreign Application Priority Data

Jul. 20, 1998 (DE) .......................................... 198 32 556

(51) Int. Cl.$^7$ ............................................... C08G 18/79
(52) U.S. Cl. ..................... 528/59; 528/905; 252/182.22
(58) Field of Search ...................... 252/182.22; 528/59, 528/905

(56) References Cited

U.S. PATENT DOCUMENTS 5,140,089 A * 8/1992 Muhlfeld et al.
5,747,627 A * 5/1998 Kimura et al.
6,051,675 A * 4/2000 Gras

* cited by examiner

Primary Examiner—Rachel Gorr
(74) Attorney, Agent, or Firm—Stephen D. Harper; Daniel S. Ortiz

(57) ABSTRACT

An isocyanate bonding agent which has a low content of highly volitile residual monomers which forms little migrate and has improved lubricant adhesion is provided. The bonding agent comprises prepolymers having isocyanate groups of different reactivities or the reaction products thereof.

24 Claims, No Drawings

MONOMER-POOR POLYURETHANE BONDING AGENT HAVING AN IMPROVED LUBRICANT ADHESION

This application is a continuation of application Ser. No. 09/744,087, filed Jan. 19, 2001, now abandoned, which is a 371 of PCT/EP99/04890 filed Jul. 10, 1999.

FIELD OF THE INVENTION

This invention relates to a polyurethane binder and to processes for producing a low-viscosity polyurethane binder containing isocyanate groups which only has a low content of readily volatile residual monomers, essentially forms no "migrates" and shows improved lubricant adhesion. The invention also relates to the use of a low-viscosity polyurethane binder containing isocyanate groups (NCO groups) in the production of adhesives, more particularly one-component and two-component adhesives, for example for bonding web-form materials of, for example, paper, plastic and/or aluminium, coatings, more particularly lacquers, emulsion paints and casting resins as well as moldings.

BACKGROUND OF THE INVENTION

Isocyanate-terminated polyurethane prepolymers have been known for some time. They may readily be chain-extended or crosslinked with suitable compounds, usually polyhydric alcohols, to form high molecular weight materials. Polyurethane prepolymers have acquired significance in many fields of application, including for example the production of adhesives, coatings, casting resins and moldings.

In order to obtain isocyanate-terminated polyurethane prepolymers, it is standard practice to react polyhydric alcohols with an excess of polyisocyanates, generally at least predominantly diisocyanates. Molecular weight can be controlled at least approximately through the ratio of OH groups to isocyanate groups. Whereas a ratio of OH groups to isocyanate groups of, or approaching, 1:1 leads to generally high molecular weights, a statistical average of one diisocyanate molecule—where diisocyanates are used—is attached to each OH group where the OH: isocyanate group ratio is about 2:1, so that ideally no oligomerization or chain extension occurs in the course of the reaction.

In practice, however, chain-extending reactions are impossible to suppress completely, even in the last case mentioned, with the result that, on completion of the reaction, a certain quantity of the component used in excess is left over irrespective of the reaction time. If diisocyanate, for example, is used as the excess component, a generally considerable proportion of this component remains behind in the reaction mixture for the reasons explained above.

The presence of such components is particularly problematical when they consist of readily volatile diisocyanates. The vapors of these diisocyanates are often harmful to the skin and the application of products with a high content of such readily volatile diisocyanates requires elaborate measures on the part of the user to protect the people involved in processing the product, more particularly elaborate measures for keeping the surrounding air clean to breathe.

Since protective measures and cleaning measures generally involve considerable expense, there is a need on the part of the user for products which have a low percentage content of readily volatile diisocyanates depending on the isocyanate used.

In the context of the present invention, "readily volatile" substances are understood to be substances which have a vapor pressure at around 30° C. of more than about 0.0007 mmHg or a boiling point of less than about 190° C. (70 mPa).

If low-volatility diisocyanates, more particularly the widely used bicyclic diisocyanates, for example diphenyl methane diisocyanates, are used instead of the readily volatile diisocyanates, polyurethane binders with a viscosity normally outside the range suitable for simple processing methods are generally obtained. In cases such as these, the viscosity of the polyurethane prepolymers can be reduced by adding suitable solvents although this is not consistent with the absence of solvents normally demanded. Another way of reducing viscosity without solvents is to add an excess of monomeric polyisocyanates which are incorporated in the coating or bond (reactive diluent) in the course of a subsequent curing/hardening process (after the addition of a hardener or by curing under the influence of moisture).

Whereas the viscosity of the polyurethane prepolymers can actually be reduced in this way, the generally incomplete reaction of the reactive diluent often leads to the presence in the bond or coating of free monomeric polyisocyanates which are capable of "migrating", for example within the coating or bond or, in some cases, even into the coated or bonded materials themselves. Corresponding constituents of a coating or bond are often referred to among experts as "migrates". By contact with moisture, the isocyanate groups of the migrates are continuously reacted to form amino groups. The aromatic amines normally formed in this way are suspected of having a carcinogenic effect.

Migrates are often not tolerable, above all in the packaging field, because any migration of the migrates through the packaging material would result in contamination of the packaged product and the consumer would inevitably come into contact with the migrates when using the product.

Accordingly, the migrates in question are undesirable above all in the packaging field, especially in the packaging of foods.

In order to avoid the disadvantages described above, EP-A 0 118 065 proposes producing polyurethane prepolymers by a two-stage process. In the first stage of this process, a monocyclic diisocyanate is reacted with a polyhydric alcohol in an OH group:isocyanate group ratio of <1 and, in the second step, a bicyclic diisocyanate is reacted with polyhydric alcohols in an OH group:isocyanate group ratio of <1 in the presence of the prepolymer prepared in the first step. A ratio of OH groups to isocyanate groups of 0.65 to 0.8:1 and preferably 0.7 to 0.75:1 is proposed for the second stage. The prepolymers obtainable in this way still have viscosities of 2500 mPas, 7150 mPas and 9260 mPas at high temperatures (75° C. and 90° C.). Lubricant compatibility is not mentioned.

EP-A 0 019 120 relates to a two-stage process for the production of elastic weather-resistant sheet-form materials. In the first stage of this process, toluene diisocyanate (TDI) is reacted with at least equimolar quantities of a polyol and the reaction product obtained is subsequently reacted with diphenyl methane diisocyanate (MDI) and a polyol. The polyurethane binders obtainable in this way are said to be capable of curing with water or with atmospheric moisture. Although the described process does give products with a relatively low viscosity, the content of free readily volatile diisocyanate (in the present case TDI) is still high (0.7% by weight) and can only be reduced when time-consuming and energy-intensive methods, for example thin-layer distillation, are used to remove excess readily volatile diisocyanate.

Hitherto unpublished German patent application DE 197 49 834.5 relates to low-monomer polyurethane binders, disclosing a two-component polyurethane binder with a low monomer content and a low migrate content.

Films used, for example, for the packaging of foods frequently have a high content of lubricants. A typical lubricant is, for example, erucic acid amide (EAA) which is often present in the film in quantities of more than about 400 ppm. Conventional adhesives used for bonding such films to form laminates often show a deterioration in laminate adhesion with increasing lubricant content of the film to be bonded. With modern efficient packaging machines, an increase in productivity is achieved by considerably increasing the operating speed of the machines. The films used for this purpose generally have a distinctly increased lubricant content —often of 600 ppm or more—in relation to relatively slow packaging machines. Unfortunately, many conventional adhesives show unsatisfactory adhesion on films with a lubricant content of this order. As a result, laminated films thus produced often show inadequate sealing seam adhesion, above all after curing.

Accordingly, the problem addressed by the present invention was to provide a polyurethane binder which would have a low viscosity and a low residual content of less than about 1% by weight of readily volatile diisocyanates. In the case of toluene diisocyanate (TDI), the residual content of readily volatile isocyanate should be less than about 0.1% by weight.

A further problem addressed by the present invention was to provide a polyurethane binder which would have a low percentage content of "migrates", i.e. a low percentage content of monomeric polyisocyanates.

Another problem addressed by the present invention was to provide a process for the production of a polyurethane binder having the properties mentioned above.

Yet another problem addressed by the invention was to provide a polyurethane binder and an adhesive which, besides the above-mentioned properties in regard to its content of readily volatile isocyanates and a low migrate content, would additionally have improved lubricant compatibility, i.e. for example improved laminate adhesion or improved sealing seam adhesion in the bonding of films with a high lubricant content.

BRIEF DESCRIPTION OF THE INVENTION

The present invention relates to a polyurethane binder with a low content of readily volatile isocyanate-functional monomers at least containing components A, B and C, in which a) a polyurethane polymer containing at least two isocyanate groups or a mixture of two or more polyurethane prepolymers containing at least two isocyanate groups is present as component A, at least one polyurethane prepolymer containing at least two differently attached types of isocyanate groups or two different polyurethane prepolymers containing at least two differently attached types of isocyanate groups in pairs of which at least one type has a lower reactivity to isocyanate-reactive groups than the other type(s), and b) an at least difunctional isocyanate which does not contain one nitrogen atom that is not part of an NCO group, or a mixture of two or more thereof, is present as component B and c) an at least difunctional isocyanate or a mixture of two or more isocyanates with an average functionality of at least two which contains at least one nitrogen atom that is not part of an NCO or urethane group per isocyanate molecule is present as component C.

DETAILED DESCRIPTION OF THE INVENTION

"Low viscosity" in the context of the present invention means a (Brookfield) viscosity at 50° C. of less than 5,000 mPas.

In the context of the present invention, the expression "polyurethane binder" is understood to be a mixture of molecules each containing at least two isocyanate groups, in which the content of molecules with a molecular weight of more than 500 is at least about 50% by weight and preferably at least about 60% by weight or about 70% by weight.

A polyurethane prepolymer containing at least two isocyanate groups or a mixture of two or more polyurethane prepolymers containing at least two isocyanate groups, which may preferably be obtained by reacting a polyol component with an at least difunctional isocyanate, is used as component A.

In the context of the present invention, a "polyurethane prepolymer" is understood to be the compound which is obtained, for example, when a polyol component is reacted with an at least difunctional isocyanate. Accordingly, the expression "polyurethane prepolymer" encompasses both compounds of relatively low molecular weight, as formed for example in the reaction of a polyol with an excess of polyisocyanate, and also oligomeric or polymeric compounds. The expression "polyurethane prepolymer" also encompasses the compounds formed, for example, in the reaction of a trihydric or tetrahydric polyol with a molar excess of diisocyanates, based on the polyol. In this case, one molecule of the resulting compound carries several isocyanate groups.

Molecular weights relating to polymeric compounds represent the number average molecular weight ($M_n$), unless otherwise indicated.

In general, the polyurethane prepolymers used for the purposes of the present invention have a molecular weight in the range from about 150 to about 15,000 or in the range from about 500 to about 10,000, for example of the order of 5,000, but especially in the range from about 700 to about 2,500.

In a preferred embodiment of the invention, the polyurethane prepolymer containing two isocyanate groups or at least one of the polyurethane prepolymers present in the mixture of polyurethane prepolymers containing two or more isocyanate groups has at least two differently attached types of isocyanate groups, of which at least one type has a lower reactivity to isocyanate-reactive groups than the other type or the other types of isocyanate groups. Isocyanate groups with a relatively low reactivity to isocyanate-reactive groups (by comparison with at least one other isocyanate group present in the polyurethane binder) are also referred to hereinafter as "less reactive isocyanate groups" while the corresponding isocyanate group with a higher reactivity to isocyanate-reactive compounds is also referred to as the "more reactive isocyanate group".

According to the present invention, therefore, a difunctional polyurethane prepolymer for example containing two differently attached isocyanate groups, one of the isocyanate groups having a higher reactivity to isocyanate-reactive groups than the other isocyanate group, may be used as component A. A polyurethane prepolymer such as this may be obtained, for example, from the reaction of a dihydric alcohol with compounds containing two different, for example difunctional, isocyanate groups, the reaction being carried out, for example, in such a way that, on average, each molecule of the dihydric alcohol reacts with one molecule of the compounds containing different isocyanate groups.

A trifunctional or higher polyurethane prepolymer may also be used as component A, in which case one molecule of the polyurethane prepolymer for example may contain a different number of less reactive and more reactive isocyanate groups.

In another preferred embodiment, mixtures of two or more different polyurethane prepolymers may be used as component A. The mixtures mentioned may be polyurethane prepolymers in which individual polyurethane molecules carry identically attached isocyanate groups. Accordingly, at least two different types of polyurethane molecules differing at least in the nature of the isocyanate groups they carry must be present in the mixture. In this embodiment, at least one more reactive and one less reactive type of isocyanate groups, i.e. a polyurethane molecule containing at least two reactive isocyanate groups and a polyurethane molecule containing at least two less reactive isocyanate groups, must be present in the mixture as a whole. Besides molecules containing one or more identically attached isocyanate groups, the mixture may also contain other molecules which carry both one or more identically attached isocyanate groups and one or more differently attached isocyanate groups.

Component A or at least part of component A may also be formed, for example, by the reaction products of difunctional or higher alcohols with an at least equimolar quantity (based on the OH groups of the difunctional or higher alcohol) of low molecular weight diisocyanates with a molecular weight of up to about 400.

In a preferred embodiment, the polyurethane prepolymer used as component A or the mixture of two or more polyurethane prepolymers contains at least one urethane group per molecule.

In another preferred embodiment of the invention, component A is prepared by an at least two-stage reaction in which c) in a first stage, a polyurethane prepolymer is prepared from an at least difunctional isocyanate and at least a first polyol component, the NCO:OH ratio being smaller than 2 and free OH groups still being present in the polyurethane prepolymer, and d) in a second stage, another at least difunctional isocyanate is reacted with the polyurethane prepolymer from the first stage, the isocyanate groups of the isocyanate added in the second stage having a higher reactivity to isocyanate-reactive compounds than at least the predominant percentage of the isocyanate groups present in the polyurethane prepolymer from the first stage.

In another preferred embodiment, the other at least difunctional isocyanate is added in a molar excess, based on free OH groups of component A.

In another preferred embodiment, component A is prepared by an at least two-stage reaction in which e) in a first stage, a polyurethane prepolymer is prepared from an at least difunctional isocyanate and at least a first polyol component, the NCO:OH ratio being smaller than 2 and free OH groups still being present in the polyurethane prepolymer, and f) in a second stage, another at least difunctional isocyanate and another polyol component are reacted with the polyurethane prepolymer from the first stage, the isocyanate groups of the isocyanate added in the second stage having a higher reactivity to isocyanate-reactive compounds than at least the predominant percentage of the isocyanate groups present in the polyurethane prepolymer from the first stage.

According to the invention, the OH:NCO ratio in the production of component A in the second stage is preferably about 0.001 to less than 1:1 and, more particularly, 0.005 to about 0.8:1.

In one preferred embodiment of the invention, the OH:NCO ratio in the second stage is about 0.2 to 0.6:1.

In another preferred embodiment of the invention, the OH:NCO ratio in the first stage is less than 1 and, more particularly, 0.5 to 0.7:1, the described ratios optionally being maintained for the second stage also.

In the context of the present invention, the expression "polyol component" encompasses a single polyol or a mixture of two or more polyols which may be used for the production of polyurethanes. A polyol is understood to be a polyhydric alcohol, i.e. a compound containing more than one OH group in the molecule.

Various polyols may be used as the polyol component for the production of component A. They include, for example, aliphatic alcohols containing 2 to 4 OH groups per molecule. The OH groups may be both primary and secondary. Suitable aliphatic alcohols include, for example, ethylene glycol, propylene glycol, butane-1,4-diol, pentane-1,5-diol, hexane-1,6-diol, heptane-1,7-diol, octane-1,8-diol and higher homologs or isomers thereof which the expert can obtain by extending the hydrocarbon chain by one $CH_2$ group at a time or by introducing branches into the carbon chain. Also suitable are higher alcohols such as, for example, glycerol, trimethylol propane, pentaerythritol and oligomeric ethers of the substances mentioned either individually or in the form of mixtures of two or more of the ethers mentioned with one another.

Other suitable polyol components for the production of component A are the reaction products of low molecular weight polyhydric alcohols with alkylene oxides, so-called polyethers. The alkylene oxides preferably contain 2 to 4 carbon atoms. Suitable reaction products of the type in question are, for example, the reaction products of ethylene glycol, propylene glycol, the isomeric butane diols or hexane diols with ethylene oxide, propylene oxide or butylene oxide or mixtures of two or more thereof. The reaction products of polyhydric alcohols, such as glycerol, trimethylol ethane and/or trimethylol propane, pentaerythritol or sugar alcohols, with the alkylene oxides mentioned to form polyether polyols are also suitable. Polyether polyols with a molecular weight of about 100 to about 10,000 and preferably in the range from about 200 to about 5,000 are particularly suitable. According to the invention, polypropylene glycol with a molecular weight of about 300 to about 2,500 is most particularly preferred. Other suitable polyol components for the production of component A are polyether polyols as obtained, for example, from the polymerization of tetrahydrofuran.

The polyethers are reacted in known manner by reacting a starting compound containing a reactive hydrogen atom with alkylene oxides, for example ethylene oxide, propylene oxide, butylene oxide, styrene oxide, tetrahydrofuran or epichlorohydrin or mixtures of two or more thereof.

Suitable starting compounds are, for example, water, ethylene glycol, 1,2- or 1,3-propylene glycol, 1,4- or 1,3-butylene glycol, hexane-1,6-diol, octane-1,8-diol, neopentyl glycol, 1,4-hydroxymethyl cyclohexane, 2-methyl propane-1,3-diol, glycerol, trimethylol propane, hexane-1,2,6-triol, butane-1,2,4-triol, trimethylol ethane, pentaerythritol, mannitol, sorbitol, methyl glycosides, sugars, phenol, isononylphenol, resorcinol, hydroquinone, 1,2,2- or 1,1,2-tris-(hydroxyphenyl)-ethane, ammonia, methyl amine, ethylenediamine, tetra- or hexamethylenediamine, triethanolamine, aniline, phenylenediamine, 2,4- and 2,6-diaminotoluene and polyphenylpolymethylene polyamines which may be obtained by aniline/formaldehyde condensation.

Polyethers modified by vinyl polymers are also suitable for use as a polyol component. Products such as these can be obtained, for example, by polymerizing styrene or acrylonitrile or mixtures thereof in the presence of polyethers.

Other suitable polyol components for the production of component A are polyester polyols with a molecular weight of about 200 to about 10,000 For example, it is possible to use polyester polyols obtained by reacting low molecular weight alcohols, more particularly ethylene glycol, diethylene glycol, neopentyl glycol, hexanediol, butanediol, propylene glycol, glycerol or trimethylol propane, with caprolactone. Other suitable polyhydric alcohols for the production of polyester polyols are 1,4-hydroxymethyl cyclohexane, 2-methyl propane-1,3-diol, butane-1,2,4-triol, triethylene glycol, tetraethylene glycol, polyethylene glycol, dipropylene glycol, polypropylene glycol, dibutylene glycol and polybutylene glycol.

Other suitable polyester polyols can be obtained by polycondensation. Thus, dihydric and/or trihydric alcohols may be condensed with less than the equivalent quantity of dicarboxylic acids and/or tricarboxylic acids or reactive derivatives thereof to form polyester polyols. Suitable dicarboxylic acids are, for example, succinic acid and higher homologs thereof containing up to 16 carbon atoms, unsaturated dicarboxylic acids, such as maleic acid or fumaric acid, and aromatic dicarboxylic acids, more particularly the isomeric phthalic acids, such as phthalic acid, isophthalic acid or terephthalic acid. Citric acid and trimellitic acid, for example, are also suitable tricarboxylic acids. Polyester polyols of at least one of the dicarboxylic acids mentioned and glycerol which have a residual content of OH groups are particularly suitable for the purposes of the present invention. Particularly suitable alcohols are hexanediol, ethylene glycol, diethylene glycol or neopentyl glycol or mixtures of two or more thereof. Particularly suitable acids are isophthalic acid and adipic acid and mixtures thereof.

In a particularly preferred embodiment of the invention, polyols used as polyol component for the production of component A are, for example, dipropylene glycol and/or polypropylene glycol with a molecular weight of about 400 to about 2,500 and polyester polyols, preferably polyester polyols obtainable by polycondensation of hexanediol, ethylene glycol, diethylene glycol or neopentyl glycol or mixtures of two or more thereof and isophthalic acid or adipic acid or mixtures thereof.

High molecular weight polyester polyols include, for example, the reaction products of polyhydric, preferably dihydric, alcohols (optionally together with small quantities of trihydric alcohols) and polybasic, preferably dibasic, carboxylic acids. Instead of free polycarboxylic acids, the corresponding polycarboxylic anhydrides or corresponding polycarboxylic acid esters with alcohols preferably containing 1 to 3 carbon atoms may also be used (where possible). The polycarboxylic acids may be aliphatic, cycloaliphatic, aromatic or heterocyclic or both. They may optionally be substituted, for example by alkyl groups, alkenyl groups, ether groups or halogens. Suitable polycarboxylic acids are, for example, succinic acid, adipic acid, suberic acid, azelaic acid, sebacic acid, phthalic acid, isophthalic acid, terephthalic acid, trimellitic acid, phthalic anhydride, tetrahydrophthalic anhydride, hexahydrophthalic anhydride, tetrachlorophthalic anhydride, endomethylene tetrahydrophthalic anhydride, glutaric anhydride, maleic acid, maleic anhydride, fumaric acid, dimer fatty acid or trimer fatty acid or mixtures of two or more thereof. Small quantities of monofunctional fatty acids may optionally be present in the reaction mixture.

The polyesters may optionally contain a small percentage of terminal carboxyl groups. Polyesters obtainable from lactones, for example ε-caprolactone, or hydroxycarboxylic acids, for example ω-hydroxycaproic acid, may also be used.

Polyacetals are also suitable polyol components. Polyacetals are compounds which can be obtained from glycols, for example diethylene glycol or hexanediol or mixtures thereof with formaldehyde. Polyacetals suitable for use in accordance with the invention may also be obtained by the polymerization of cyclic acetals.

Other suitable polyols for the production of component A are polycarbonates. Polycarbonates may be obtained, for example, by the reaction of diols, such as propylene glycol, butane-1,4-diol or hexane-1,6-diol, diethylene glycol, triethylene glycol or tetraethylene glycol or mixtures of two or more thereof, with diaryl carbonates, for example diphenyl carbonate, or phosgene.

OH-functional polyacrylates are also suitable polyol components for the production of component A. These polyacrylates are obtainable, for example, by the polymerization of ethylenically unsaturated monomers containing an OH group. Monomers such as these are obtainable, for example, by the esterification of ethylenically unsaturated carboxylic acids and dihydric alcohols, the alcohol generally being present in a slight excess. Ethylenically unsaturated carboxylic acids suitable for this purpose are, for example, acrylic acid, methacrylic acid, crotonic acid or maleic acid. Corresponding OH-functional esters are, for example, 2-hydroxyethyl acrylate, 2-hydroxyethyl methacrylate, 2-hydroxypropyl acrylate, 2-hydroxypropyl methacrylate, 3-hydroxypropyl acrylate or 3-hydroxypropyl methacrylate or mixtures of two or more thereof.

To produce component A, the corresponding polyol component is reacted with an at least difunctional isocyanate. Suitable at least difunctional isocyanates for the production of component A are basically any isocyanates containing at least two isocyanate groups although, in general, compounds containing 2 to 4 isocyanate groups, more particularly 2 isocyanate groups, are preferred for the purposes of the present invention.

At least difunctional isocyanates suitable as the at least difunctional isocyanate for the production of component A are described in the following.

These at least difunctional isocyanates are, for example, ethylene diisocyanate, 1,4-tetramethylene diisocyanate, 1,6-hexamethylene diisocyanate (HDI), cyclobutane-1,3-diisocyanate, cyclohexane-1,3- and -1,4-diisocyanate and mixtures of two or more thereof, 1-isocyanato-3,3,5-trimethyl-5-isocyanatomethyl cyclohexane (isophorone diisocyanate, IPDI), 2,4- and 2,6-hexahydrotoluene diisocyanate, tetramethyl xylylene diisocyanate (TMXDI), 1,3- and 1,4-phenylene diisocyanate, 2,4- or 2,6-toluene diisocyanate, diphenyl methane-2,4'-diisocyanate, diphenylmethane-2,2'-diisocyanate or diphenylmethane-4,4'-diisocyanate or mixtures of two or more of the diisocyanates mentioned.

According to the invention, other suitable isocyanates for the production of component A are trifunctional or higher isocyanates obtainable, for example, by oligomerization of diisocyanates. Examples of such trifunctional and higher polyisocyanates are the triisocyanurates of HDI or IPDI or mixtures thereof or mixed triisocyanurates thereof.

In one preferred embodiment of the invention, diisocyanates containing two isocyanate groups differing in their reactivity are used for the production of component A. Examples of such diisocyanates are 2,4- and 2,6-toluene diisocyanate (TDI) and isophorone diisocyanate (IPDI). With non-symmetrical diisocyanates such as these, one isocyanate group generally reacts far more quickly with isocyanate-reactive groups, for example OH groups, while the remaining isocyanate group reacts comparatively sluggishly. Accordingly, in one preferred embodiment, a monocyclic non-symmetrical diisocyanate containing two isocyanate groups differing in their reactivity, as described above, is used for the production of component A.

In one particularly preferred embodiment, 2,4- or 2,6-toluene diisocyanate (TDI) or a mixtures of the two isomers, but especially pure 2,4-TDI, is used for the production of component A.

The polyurethane binder according to the invention contains an at least difunctional isocyanate which does not contain one nitrogen atom that is not part of an NCO group or a mixture of two or more thereof as component B.

Component B may be formed, for example, by at least difunctional isocyanates or by a mixture of two or more isocyanates with an average functionality of at least about two.

In a preferred embodiment of the invention, component B contains at least one at least difunctional isocyanate of which the NCO groups are more reactive to NCO-reactive groups, for example in a urethanization, thiourethanization, biuretization or allophanatization reaction, than the less reactive isocyanate groups of the polyurethane prepolymers present in component A.

The isocyanate groups of the difunctional isocyanates present in component B may differ, or may be substantially identical, in their reactivity. In a preferred embodiment of the invention, at least difunctional isocyanates of which the isocyanate groups are identical in their reactivity may also be used as component B.

Component B generally has a molecular weight of up to about 2,000. However, its molecular weight is preferably lower, for example below about 1,000, below about 700 or below about 400 g/mole.

According to the invention, 4,4'-diphenylmethane diisocyanate (MDI), 2,2'-diphenylmethane diisocyanate, 2,4'-diphenylmethane diisocyanate and HDI, IPDI or TMXDI, for example, is suitable for use as component B.

In a preferred embodiment, 4,4'-diphenylmethane diisocyanate (MDI), 2,2'-diphenylmethane diisocyanate or 2,4'-diphenylmethane diisocyanate are used.

The polyurethane binder according to the invention contains at least about 3% by weight of component B, based on the polyurethane binder as a whole. In a preferred embodiment, the polyurethane binder contains about 5 to about 25% by weight of component B.

The polyurethane binder according to the invention preferably has a content of readily volatile isocyanate-functional monomers of less than 2% by weight or less than 1% by weight or preferably less than 0.5% by weight. These limits apply in particular to readily volatile isocyanate compounds which have only a limited danger potential for people involved in their processing, for example isophorone diisocyanate (IPDI), hexamethylene diisocyanate (HDI), tetramethyl xylylene diisocyanate (TMXDI) or cyclohexane diisocyanate. In the case of certain readily volatile isocyanate compounds, especially those which represent a serious risk to people involved in their processing, their content in the polyurethane binder according to the invention is preferably less than 0.3% by weight and more preferably less than 0.1% by weight. These particular isocyanate compounds include, above all, toluene diisocyanate (TDI). In another preferred embodiment of the invention, the polyurethane binder has a TDI and HDI content of less than 0.05% by weight.

The polyurethane binder according to the invention contains an at least difunctional isocyanate or a mixture of two or more isocyanates with an average functionality of at least two which contains at least one nitrogen atom that is not part of an NCO or urethane group per isocyanate as component C.

Accordingly, the NCO-containing carbodiimides obtainable by reaction of diisocyanates under suitable conditions and in the presence of suitable catalysts are suitable for use in component C.

The isocyanates suitable for carbodiimide formation are, for example, compounds with the general structure O=C=N—X—N=C=O where X is an aliphatic, alicyclic or aromatic radical, preferably an aliphatic or alicyclic radical conditions 4 to 18 carbon atoms.

Examples of suitable isocyanates are 1,5-naphthylene diisocyanate, 4,4'-diphenyl methane diisocyanate (MDI), hydrogenated MDI ($H_{12}$-MDI), xylylene diisocyanate (XDI), tetramethyl xylylene diisocyanate (TMXDI), 4,4'-diphenyl dimethyl methane diisocyanate, di- and tetraalkylene diphenyl methane diisocyanate, 4,4'-dibenzyl diisocyanate, 1,3-phenylene diisocyanate, 1,4-phenylene diisocyanate, the isomers of toluene diisocyanate (TDI), 1-methyl-2,4-diisocyanatocyclohexane, 1,6-diisocyanato-2,2,4-trimethyl hexane, 1,6-diisocyanato-2,4,4-trimethyl hexane, 1-isocyanatomethyl-3-isocyanato-1,5,5-trimethyl cyclohexane (IPDI), chlorinated and brominated diisocyanates, phosphorus-containing diisocyanates, 4,4'-diisocyanatophenyl perluoroethane, tetramethoxybutane-1,4-diisocyanate, 1,4-butane diisocyanate, 1,6-hexane diisocyanate (HDI), dicyclohexylmethane diisocyanate, cyclohexane-1,4-diisocyanate, ethylene diisocyanate, phthalic acid-bis-isocyanatoethyl ester; diisocyanates containing reactive halogen atoms, such as 1-chloromethylphenyl-2,4-diisocyanate, 1-bromomethylphenyl-2,6-diisocyanate, 3,3-bis-chloromethyl-ether-4,4'-diphenyl diisocyanate.

Other suitable diisocyanates are, for example, trimethyl hexamethylene diisocyanate, 1,4-diisocyanatobutane, 1,12-diisocyanatododecane and dimer fatty acid diisocyanate. Tetramethylene, hexamethylene, undecane, dodecamethylene, 2,2,4-trimethylhexane, 1,3-cyclohexane, 1,4-cyclohexane, 1,3- and 1,4-tetramethyl xylene, isophorone, 4,4-dicyclohexyl methane and lysine ester diisocyanate are particularly suitable.

The reaction (carbodiimide formation) products of MDI, TDI, HDI or IPDI or of mixtures of two or more thereof are especially suitable Also suitable are the trimerization and oligomerization products of the polyisocyanates which can be obtained by suitably reacting polyisocyanates, preferably diisocyanates, to form isocyanurate rings. If oligomerization products are used, those which have a degree of oligomerization of on average about 3 to about 5 are particularly suitable.

Isocyanates suitable for the reaction are the diisocyanates mentioned above, the trimerization products of the isocyanates HDI, MDI or IPDI being particularly preferred.

Polymeric isocyanates obtained, for example, as bottom residue in the distillation of diisocyanates are also suitable for use as component C. The "polymeric MDI" which is obtainable from the distillation residue in the distillation of MDI and which contains at least one nitrogen atom that is not part of an NCO or urethane group per isocyanate molecule is particularly suitable.

Component C is added to the polyurethane binder according to the invention in such a quantity that the polyurethane binder as a whole contains about 1 to about 40% by weight of component C. In a preferred embodiment of the invention, the polyurethane binder contains about 5 to about 30% by weight and more particularly about 10 to about 22% by weight of component C.

A polyurethane binder with the advantages according to the invention can be produced in basically any way. However, two processes which are described hereinafter have proved to be particularly advantageous.

For example, the polyurethane binder can be directly produced by preparing component A and subsequently adding components B and C simultaneously or successively. Component B may optionally be added together with another polyol component.

Accordingly, the present invention also relates to an at least three-stage process for the production of a polyurethane binder containing isocyanate groups, characterized in that h) in a first stage, a polyurethane prepolymer is prepared from an at least difunctional isocyanate and at least one polyol component i) in a second stage, another at least difunctional isocyanate which does not contain one nitrogen atom that is not part of an NCO group or a mixture of two or more thereof and j) in a third stage, an at least difunctional isocyanate or a mixture of two or more isocyanates with an average functionality of at least two is added, at least one isocyanate containing at least one nitrogen atom that is not part of an NCO group, the predominant percentage of the isocyanate groups present on completion of the first stage having a lower reactivity to isocyanate-reactive groups, more particularly to OH groups, than the isocyanate groups of the at least difunctional isocyanate added in the second stage.

In principle, any of the polyols component which have already been mentioned herein may be used as the other polyol component.

In one advantageous embodiment, the OH:NCO ratio in the first stage of the process according to the invention is less than 1:1. In one preferred embodiment, the ratio of OH groups to isocyanate groups in the first stage is about 0.4 to about 0.7:1 and, more particularly, more than 0.5 to about 0.7:1.

The reaction of a polyol component with the at least difunctional isocyanate in a first stage may be carried out in any manner known to the expert under the general rules for producing polyurethanes. For example, the reaction may be carried out in the presence of solvents. Suitable solvents are, basically, any of the solvents typically used in polyurethane chemistry, more particularly esters, ketones, halogenated hydrocarbons, alkanes, alkenes and aromatic hydrocarbons. Examples of such solvents are methylene chloride, trichloroethylene, toluene, xylene, butyl acetate, amyl acetate, isobutyl acetate, methyl isobutyl ketone, methoxybutyl acetate, cyclohexane, cyclohexanone, dichlorobenzene, diethyl ketone, diisobutyl ketone, dioxane, ethyl acetate, ethylene glycol monobutyl ether acetate, ethylene glycol monoethyl acetate, 2-ethylhexyl acetate, glycol diacetate, heptane, hexane, isobutyl acetate, isooctane, isopropyl acetate, methyl ethyl ketone, tetrahydrofuran or tetrachloroethylene or mixtures of two or more of the solvents mentioned.

If the reaction components themselves are liquid or if at least one or more of the reaction components form(s) a solution or dispersion of other insufficiently liquid reaction components, there is no need at all to use solvents. A solventless reaction represents a preferred embodiment of the invention.

To carry out the first stage of the process according to the invention, the polyol is introduced into a suitable vessel, optionally together with a suitable solvent, and mixed. The at least difunctional isocyanate is then added with continued mixing. To accelerate the reaction, the temperature is normally increased. In general, the reaction mixture is heated to about 40 to about 80° C. The exothermic reaction which then begins provides for an increase in the temperature. The temperature of the mixture is kept at about 70 to about 110° C., for example at about 85 to 95° C. or, more particularly, at about 75 to about 85° C., the temperature optionally being adjusted by suitable external measures, for example heating or cooling.

Catalysts typically used in polyurethane chemistry may optionally be added to the reaction mixture to accelerate the reaction. Dibutyl tin dilaurate or diazabicyclooctane (DABCO) is preferably added. If it is desired to use a catalyst, the catalyst is generally added to the reaction mixture in a quantity of about 0.005% by weight or about 0.01% by weight to about 0.2% by weight, based on the mixture as a whole.

The reaction time for the first stage depends upon the polyol component used, upon the at least difunctional isocyanate used, upon the reaction temperature and upon the catalyst present, if any. The total reaction time is normally about 30 minutes to about 20 hours.

Isophorone diisocyanate (IPDI), tetramethylene xylylene diisocyanate (TMXDI), hydrogenated diphenyl methane diisocyanate ($MDI_{H12}$) or toluene diisocyanate (TDI) or a mixture of two or more thereof is preferably used as the at least difunctional isocyanate in the first stage.

To carry out the second stage of the process according to the invention, at least one other at least difunctional isocyanate which does not contain one nitrogen atom that is not part of an NCO group or a mixture of two or more such isocyanates is reacted, optionally together with another polyol component, in admixture with component A obtained in the first stage. Any polyol from the group of polyols listed in the foregoing or a mixture of two or more thereof may be used as a constituent of the other polyol component optionally present. However, a polypropylene glycol with a molecular weight of about 400 to about 2,500 or a polyester polyol with at least a high percentage and, more particularly, a predominant percentage of aliphatic dicarboxylic acids or a mixture of these polyols is preferably used as the polyol component in the second stage of the process according to the invention.

At least one polyisocyanate of which the isocyanate groups have a higher reactivity than isocyanate groups of relatively low reactivity present in the prepolymer is used as the at least difunctional isocyanate which does not contain one nitrogen atom that is not part of an NCO group in the second stage of the process according to the invention. In other words, reactive isocyanate groups emanating from the at least difunctional isocyanate originally used for the production of prepolymer A may be present in the prepolymer, the only requirement in this connection being that at least a small percentage, preferably the predominant percentage, of the isocyanate groups present in the prepolymer of component A should have a lower reactivity than the isocyanate groups of the other at least difunctional isocyanate added in the second stage of the process according to the invention which does not contain one nitrogen atom that is not part of an NCO group.

A bicyclic aromatic symmetrical diisocyanate is preferably used as the other at least difunctional isocyanate which does not contain one nitrogen atom that is not part of an NCO group. The bicyclic isocyanates include, for example, diisocyanates of the diphenyl methane series, more particularly 2,2'-diphenyl methane diisocyanate, 2,4'-diphenyl methane diisocyanate and 4,4'-diphenyl methane diisocyanate. Of the diisocyanates mentioned, diphenyl methane diisocyanate, more particularly 4,4'-diphenyl methane diisocyanate, is particularly preferred as the other at least difunctional isocyanate for the second stage of the process according to the invention.

The other at least difunctional isocyanate which does not contain one nitrogen atom that is not part of an NCO group is used in the second stage in a quantity of about 1 to about 50% by weight, preferably in a quantity of about 10 to about 30% by weight and more preferably in a quantity of about 15 to about 25% by weight, based on the total quantity of polyisocyanates used in all the stages of the process according to the invention.

In one preferred embodiment, the OH:NCO ratio in the second stage is about 0.2 to about 0.6:1 and, more particularly, up to about 0.5:1. By this is meant the OH:NCO ratio of the components added in the second stage excluding any isocyanate groups emanating from the prepolymer A.

However, a polyurethane binder with the advantages according to the invention can also be produced by mixing individual components D, E, F and G.

Accordingly, the present invention also relates to a process for the production of a low-viscosity polyurethane binder containing isocyanate groups with a low content of readily volatile isocyanate-functional monomers by mixing four components D, E, F and G, characterized in that k) an isocyanate-functional polyurethane prepolymer obtainable by reacting a polyol component with an at least difunctional isocyanate is used as component D, l) another isocyanate-functional polyurethane prepolymer obtainable by reacting a polyol component with another at least difunctional isocyanate, of which the isocyanate groups have a higher reactivity to isocyanate-reactive groups than the isocyanate groups of component D, is used as component E m) an at least difunctional isocyanate which does not contain one nitrogen atom that is not part of an NCO group or a mixture of two or more thereof is used as component F and n) another at least difunctional isocyanate or a mixture of two or more isocyanates with an average functionality of at least two, at least one isocyanate containing at least one nitrogen atom that is not part of an NCO group, is used as component G, the quantity of component G being gauged so that, on completion of mixing and after all the reactions, if any, taking place between components D, E, F and G have ended, at least 5% by weight and more particularly at least 10% by weight—based on the polyurethane binder as a whole—of component G is present in the polyurethane binder.

The polyurethane binders according to the invention and the polyurethane binders produced in accordance with the invention preferably have a viscosity of less than 5000 mPas (as measured with a Brookfield RT DVII (Thermosell), spindle 27, 20 r.p.m., 50° C.).

In the context of the present invention, the expression "all the reactions, if any, taking place between components D, E, F and G" refers to reactions of isocyanate groups with functional groups containing isocyanate-reactive hydrogen atoms. The addition of component F, particularly when components D or E or D and E, for example, contain free OH groups, generally leads to a reaction of the isocyanate groups of component F with the free OH groups. This results in a reduction in the content of component F. Accordingly, if reactions capable of leading to a reduction in the proportion of component F are likely to occur, component F must be added in such a quantity that, after all these reactions have ended, the required minimum quantity of component F is present in the polyurethane binder.

Any of the polyols described above and mixtures of two or more of the polyols mentioned may be used as the polyol component for the production of components D and E in the process according to the invention. The polyol components in particular mentioned in the present specification as particularly suitable for the production of component A are also preferably used in the process according to the invention.

The foregoing observations on component B apply similarly to the at least difunctional isocyanate to be used as component F which does not contain one nitrogen atom that is not part of an NCO group or a mixture of two more such isocyanates.

The foregoing observations on component C apply similarly to the least difunctional isocyanate or a mixture of two or more isocyanates with an average functionality of at least two—at least one isocyanate containing at least one nitrogen atom that is not part of an NCO group—to be used as component G.

The polyurethane binder according to the invention and the polyurethane binders produced in accordance with the invention are distinguished in particular by the fact that they have an extremely low content of readily volatile monomers containing isocyanate groups which is less than 2% by weight or less than 1% by weight, less than 0.5% by weight and, more particularly, less than about 0.1% by weight. It is particularly emphasized in this connection that the process according to the invention does not require any separate process steps for removing readily volatile diisocyanate components.

Another advantage of the polyurethane binders produced by the process according to the invention is that they have a viscosity which lies in a very favorable range for processing. More particularly, the polyurethane binders produced by the process according to the invention have a viscosity below 5000 mPas (as measured with a Brookfield RT DVII (Thermosell), spindle 27, 20 r.p.m., 50° C.).

The polyurethane binders according to the invention are suitable for coating articles and more particularly for bonding articles either as such or in the form of solutions in organic solvents, for example in the solvents described in the foregoing.

Accordingly, the present invention also relates to the use of a polyurethane binder according to the invention or of a polyurethane binder produced by a process according to the invention in the production of adhesives, more particularly one-component and two-component adhesives, coatings, more particularly lacquers, emulsion paints and casting resins as well as moldings and for coating and, more particularly, bonding articles, more particularly for bonding films and for the production of laminated films.

The polyurethane binder according to the invention or the polyurethane binder produced by one of the processes according to the invention is used in particular for bonding plastics and, in one particularly preferred embodiment, for laminating plastic films, plastic films metallized with metals or with metal oxides and metal foils, more particularly aluminium foils.

The curing process, i.e. the crosslinking of the individual polyurethane binder molecules through the free isocyanate groups, may be carried out solely under the influence of atmospheric moisture, i.e. without any need to add hardeners. However, polyfunctional crosslinking agents, for example amines or, more particularly, polyfunctional alcohols, are preferably added as hardeners (two-component systems).

Film laminates made with the products produced in accordance with the invention are safe to heat-seal. This is attributable to the reduced percentage of migratable low molecular weight products in the polyurethane binders. A favorable processing temperature for the adhesives produced in accordance with the invention in heat-sealing processes is between about 30 and about 90° C.

The present invention also relates to an adhesive containing two components H and 1, o) a polyurethane binder containing isocyanate groups according to the invention or a polyurethane binder containing isocyanate groups produced by the process according to the invention being used as component H and p) a compound containing at least two functional groups reactive to the isocyanate groups of component H with a molecular weight of up to 50,000 or a mixture of two or more such compounds being used as component I.

Accordingly, any of the polyurethane binders according to the invention as described in the foregoing may be used as component H.

A compound containing at least two functional groups reactive to the isocyanate groups of component F with a molecular weight of up to 2,500 or a mixture of two or more such compounds is preferably used as component I. The at least two functional groups reactive to the isocyanate groups of component F may be selected in particular from amino groups, mercapto groups or OH groups. Compounds suitable for use in component G may contain amino groups, mercapto groups or OH groups either individually or in admixture.

The functionality of the compounds suitable for use in component I is generally at least about two. Component I preferably has a percentage of compounds with a higher functionality, for example with a functionality of three, four or more. The total (average) functionality of component I is for example about two (for example when only difunctional compounds are used as component I) or more, for example about 2.1, 2.2, 2.5, 2.7 or 3. Component I may optionally have an even higher functionality, for example of about 4 or higher.

Component I preferably contains a polyol carrying at least two OH groups. Any of the polyols mentioned in the foregoing are suitable for use in component I providing they satisfy the limiting criterion of the upper molecular weight limit.

Component I is generally used in such a quantity that the ratio of isocyanate groups of component H to functional groups reactive with isocyanate groups of component H in component I is about 5:1 to about 1:1 and, more particularly, about 2:1 to about 1:1.

The adhesive according to the invention generally has a viscosity of about 250 to about 10,000 mPas and, more particularly, in the range from about 500 to about 8000 mPas or to about 5000 mPas (Brookfield RVT DVII, spindle 27, 20 r.p.m., 40° C.).

The adhesive according to the invention may optionally contain additives. The additives may make up as much as about 30% by weight of the adhesive as a whole.

Additives suitable for use in accordance with the present invention include, for example, plasticizers, stabilizers, antioxidants, dyes, photostabilizers and fillers.

Suitable plasticizers are, for example, plasticizers based on phthalic acid, more particularly dialkyl phthalates, phthalic acid esters esterified with a linear alkanol containing about 6 to about 12 carbon atoms representing preferred plasticizers. Dioctyl phthalate is particularly preferred.

Other suitable plasticizers are benzoate plasticizers, for example sucrose benzoate, diethylene glycol dibenzoate and/or diethylene glycol benzoate, in which about 50 to about 95% of all the hydroxyl groups have been esterified, phosphate plasticizers, for example t-butylphenyl diphenyl phosphate, polyethylene glycols and derivatives thereof, for example, diphenyl ethers of poly(ethylene glycol), liquid resin derivatives, for example the methyl ester of hydrogenated resin, vegetable and animal oils, for example glycerol esters of fatty acids and polymerization products thereof.

Stabilizers or antioxidants suitable for use as additives in accordance with the invention include sterically hindered phenols of high molecular weight ($M_n$), polyhydric phenols and sulfur- and phosphorus-containing phenols. Phenols suitable for use as additives in accordance with the invention are, for example, 1,3,5-trimethyl-2,4,6-tris-(3,5-ditert.butyl-4-hydroxybenzyl)-benzene; pentaerythritol tetrakis-3-(3,5-ditert.butyl-4-hydroxyphenyl)-propionate; n-octadecyl-3,5-ditert.butyl-4-hydroxyphenyl)-propionate; 4,4-methylene-bis-(2,6-ditert.butylphenol); 4,4-thiobis-(6-tert.butyl-o-cresol); 2,6-ditert.butylphenol; 6-(4-hydroxyphenoxy)-2,4-bis-(n-octylthio)-1,3,5-triazine; di-n-octadecyl-3,5-ditert.butyl-4-hydroxybenzyl phosphonates; 2-(n-octylthio)-ethyl-3,5-ditert.butyl-4-hydroxybenzoate; and sorbitol hexa-[3-(3,5-ditert.butyl-4-hydroxyphenyl)-propionate].

Suitable photostabilizers are, for example, those marketed under the name of Tinuvin® (manufacturer: Ciba Geigy).

Other additives may be incorporated in the adhesives according to the invention in order to vary certain properties. These other additives include, for example, dyes, such as titanium dioxide, fillers, such as talcum, clay and the like. The adhesives according to the invention may optionally contain small quantities of thermoplastic polymers or copolymers, for example ethylene/vinyl acetate (EVA), ethylene/acrylic acid, ethylene/meth-acrylate and ethylene/n-butyl acrylate copolymers which optionally provide the adhesive with additional flexibility, toughness and strength. It is also possible—and preferred in accordance with the invention—to add certain hydrophilic polymers, for example polyvinyl alcohol, hydroxyethyl cellulose, hydroxypropyl cellulose, polyvinyl methyl ether, polyethylene oxide, polyvinyl pyrrolidone, polyethyl oxazolines or starch or cellulose esters, more particularly the acetates with a degree of substitution of less than 2.5, which increase the wettability of the adhesives.

The following Examples are intended to illustrate the invention without limiting it in any way.

EXAMPLES

Explanation of the raw materials and abbreviations in Table 1:

| | |
|---|---|
| A1–A5 | adhesive formulations 1 to 5 |
| H | hardener (polyol mixture), OHV = 138.8 |
| PE1 | polyether based on propylene glycol |
| PE 2 | polyether based on propylene glycol |
| DEG | diethylene glycol |
| PES | polyester based on adipic acid, diethylene glycol, phthalic acid and dipropylene glycol with 2 OH groups |
| PE3 | polyether based on propylene glycol |
| MDI-C | MDI carbodiimide dimer |
| HDI-T | HDI trimer |
| HDI-O | HDI oligomer |
| MDI-P | polymeric MDI (distillation bottom residue) |
| ADR-1 | NCO:OH addition ratio for component A and component B |
| ADR-T | total NCO:OH addition ratio |
| V | viscosity (Brookfield RVTD, 40° C.) |
| MC | monomer contents in % by weight (based on formulation as a whole) |
| m-TDI | monomeric TDI |
| m-MDI | monomeric MDI |
| OHV | OH value in [mg KOH/g] |
| NCO value | NCO content in % by weight (based on formulation as a whole) |
| NCO-F | final NCO content |

Explanations and abbreviations in Table 2:

| | |
|---|---|
| E1–8 | Examples 1 to 8 |
| C1–2 | Comparison Example 1 and 2 |
| LS | laminate structure |
| F1 | 12μ thick polyethylene terephthalate (PETP) film |
| F2 | 70μ thick polyethylene (PE) film with a plasticizer content of 400 ppm erucic acid amide (EAA) |
| F3 | 60μ thick polyethylene (PE) film with a plasticizer content of 800 ppm erucic acid amide (EAA) |
| (EAA) LA | laminate adhesion |
| SSA | sealing seam adhesion |
| coh. AS | cohesive adhesive splitting |
| adh. alt. | alternating adhesion, adhesion failure takes place alternately at both materials |

The mixing ratio of adhesive preparation to hardener was 1:1 in E1 to E8 and 100:70 in C1 and C2.

TABLE 1

Adhesive formulations (all figures = % by weight unless otherwise indicated)

| Raw materials | OHV or NCO value | A1 | A2 | A3 | A4 | A5 | H |
|---|---|---|---|---|---|---|---|
| PE1 | 111 | 29.4 | 29.4 | 29.4 | 29.4 | 29.4 | |
| PE2 | 267 | 9.8 | 9.8 | 9.8 | 9.8 | 9.8 | |
| DEG | 1056 | 4.9 | 4.9 | 4.9 | 4.9 | 4.9 | 1.8 |
| PES | 108 | | | | | | 93.0 |
| PE 3 | 373 | | | | | | 5.2 |
| TDI | 48.3 | 25.6 | 24.9 | 24.9 | 24.9 | 24.9 | |
| MDI | 33.4 | 30.9 | 20.0 | 20.0 | 20.0 | 20.0 | |
| MDI-C | 33 | | 13.1 | | | | |
| HDI-T | 21 | | | 20.6 | | | |
| HDI-O | 21.9 | | | | 19.8 | | |
| MDI-P | 31 | | | | | 14.0 | |
| NCO-F | | 14.0 | 13.5 | 13.3 | 13.1 | 14.3 | |
| ADR-1 | | 1.6 | 1.6 | 1.6 | 1.6 | 1.6 | |
| ADR-G | | 2.76 | 2.76 | 2.76 | 2.76 | 2.76 | |
| V [mPas] | | | | | | | |
| 40° C. | | 2700 | 4450 | 6000 | 5300 | 4320 | |
| 50° C. | | 1200 | 1800 | 2550 | 1970 | 1790 | |
| 60° C. | | 550 | 956 | 1200 | 950 | 790 | |
| m-TDI | | 0.03 | 0.03 | 0.07 | 0.07 | 0.09 | |
| m-MDI | | 30 | 24 | 16 | 14 | 20 | |

In all Examples, the quantity applied was 2 g/m².

TABLE 2

Laminate evaluation

| | Laminate structure | Adhesive system | LA after 1 day in N/15 mm | LA after 6 days in N/15 mm | LA after curing in N/15 mm | SSA after curing in N/15 mm |
|---|---|---|---|---|---|---|
| E1 | F1/F2 | A2/H | 1.8 coh. AS | 3.3 PETP tears | 3.3 PETP tears | 43 LS |
| E2 | F1/F2 | A3/H | 0.2 coh. AS | 2.2 Adh. separation adh. alt. | 3.2 PETP tears | 42 LS |

TABLE 2-continued

| | Laminate structure | Adhesive system | LA after 1 day in N/15 mm | LA after 6 days in N/15 mm | LA after curing in N/15 mm | SSA after curing in N/15 mm |
|---|---|---|---|---|---|---|
| E3 | F1/F2 | A4/H | 0.2 coh. AS | 3.3 PETP tears | 3.3 PETP tears | 43 LS |
| E4 | F1/F2 | A5/H | 0.25 coh. AS | 3.6 PETP tears | 3.4 PETP tears | 44 LS |
| C1 | F1/F2 | A1/H | 3.2 PETP tears | 3.5 PETP tears | 3.3 PETP tears | 43 LS |
| E5 | F1/F3 | A2/H | 0.6 coh. AS | 2.9 PETP tears | 3.4 PETP tears | 36 LS |
| E6 | F1/F3 | A3/H | 0.1 coh. AS | 1.8 Adh. separation adh. alt. | 3.6 PETP tears | 35 LS |
| E7 | F1/F3 | A4/H | <0.1 coh. AS | 1.6 Adh. separation adh. alt. | 3.2 PETP tears | 34 LS |
| E8 | F1/F3 | A5/H | 0.5 coh. AS | 3.2 PETP tears | 3.4 PETP tears | 34 LS |
| C2 | F1/F3 | A1/H | 1.0 coh. AS | 1.6 Adh. separation adh. alt. | 1.6 Adh. separation adh. alt. | 23, PETP tears at sealing edge |

What is claimed is:

1. A polyurethane binder with a low content of readily volatile isocyanate-functional monomers containing components A, B and C, wherein;
   a. A comprises a polyurethane prepolymer containing at least two isocyanate groups or a mixture of two or more polyurethane prepolymers containing at least two isocyanate groups, wherein at least one polyurethane prepolymer contains at least two differently attached types of isocyanate groups or two different polyurethane prepolymers containing at least two differently attached types of isocyanate groups in pairs of which at least one type has a lower reactivity to isocyanate-reactive groups than the other type(s);
   b. B comprises an at least difunctional isocyanate which does not contain one nitrogen atom that is not part of an NCO group, or a mixture of two or more thereof, wherein the binder contains from about 3% to 25% by weight of component B; and
   c. C comprises an at least difunctional isocyanate or a mixture of two or more isocyanates with an average functionality of at least two which contains at least one nitrogen atom that is not part of an NCO or urethane group per isocyanate molecule wherein the polyurethane binder contains at least about 5% by weight of component C and has a viscosity at 50° C. less than 5,000 mPas (as measured by a Brookfield RVTDV II viscometer, spindle 27, at 20 r.p.m.).

2. The polyurethane binder as claimed in claim 1, comprising:
   at least 10% by weight of component C, based on the polyurethane binder as a whole.

3. The polyurethane binder as claimed in claim 1 wherein the content of readily volatile monomers containing isocyanate groups is less than 1% by weight, and the toluene diisocyanate (TDI) content is less than 0.1% by weight.

4. The polyurethane binder as claimed in claim 1 wherein component A is produced by en at least two-stage process comprising:
   a. preparing in a first stage a first polyurethane prepolymer by reacting a first at least difunctional isocyanate and a first polyol component, the NCO:OH ratio being smaller than 2 wherein free OH groups are present in the first polyurethane prepolymer; and
   b. reacting in a second stage a second at least difunctional isocyanate with the first polyurethane prepolymer from the first stage, wherein,
the isocyanate groups of the second at least difunctional isocyanate, have a higher reactivity to isocyariate-reactive compounds than at least the predominant percentage of the isocyanate groups present in the first polyurethane prepolymer from the first stage.

5. The polyurethane binder as claimed in claim 4, wherein the second at least difunctional isocyanate is added in a molar excess, based on free OH groups of the first prepolymer.

6. The polyurethane binder as claimed in claim 1, wherein component A is produced by an at least two-stage process comprising:
   a. in a first stage, preparing a polyurethane prepolymer by reacting a first at least difunctional isocyanate and at least a first polyol component, the NCO:OH ratio being smaller than 2 and free OH groups are present in the first polyurethane prepolymer; and
   b. in a second stage, reacting a second at least difunctional isocyanate and a second polyol component with the first polyurethane prepolymer from the first stage, wherein,
the isocyanate groups of the second isocyanate have a higher reactivity to isocyanate-reactive compounds than the predominant percentage of the isocyanate groups present in the first polyurethane prepolymer from the first stage.

7. The polyurethane binder as claimed in claim 6, wherein, the second at least difunctional isocyanate is added in a molar excess, based on free OH groups of the first prepolymer and the second polyol component.

8. The polyurethane binder as claimed in claim 4 wherein the OH:NCO ratio in the second stage is between 0.1:1 and 1:1.

9. The polyurethane binder as claimed in claim 4 wherein the OH:NCO ratio in the first stage is less than 1:1.

10. An at least three-stage process for the production of a polyurethane binder of claim 1 containing isocyanate groups, which comprises:
   a. preparing a polyurethane prepolymer by reaction of a first at least difunctional isocyanate and at least one first polyol component; to form a first prepolymer;
   b. reacting a second at least difunctional isocyanate or a second at least difunctional isocyanate and a second polyol component with the first prepolymer; and
   c. adding a third at least difunctional isocyanate or a mixture of two or more isocyanates with an average functionality of at least two, wherein the third isocyanate comprises at least one isocyanate containing at least one nitrogen atom that is not part of an NCO group or urethane group,
the predominant percentage of the isocyanate groups present in the first prepolymer having a lower reactivity to isocyanate-reactive groups, than the isocyanate groups of the second at least difunctional isocyanate.

11. The process as claimed in claim 10, wherein the OH:NCO ratio in the second stage is 0.2:1 to 0.6:1.

12. The process as claimed in claim 10, wherein the OH:NCO ratio in the first stage is less than 1:1.

13. The process as claimed in claim 10 wherein, the first at least difunctional isocyanate comprises at least one member selected from the group consisting of isophorone diisocyanate (IPDI), tetramethyl xylylene diisocyanate (TMXDI), hydrogenated diphenyl methane diisocyanate ($MDI_{H12}$) and toluene diisocyanate (TDI).

14. The process as claimed in claim 11 wherein the second at least difunctional isocyanate comprises diphenyl methane diisocyanate (MDI).

15. A process for the production of a low-viscosity polyurethane binder containing isocyanate groups with a low content of readily volatile isocyanate-functional monomers comprising mixing four components D, E, F and G, wherein, a. D comprises an isocyanate-functional polyurethane prepolymer obtained by reacting a first polyol component with a first at least difunctional isocyanate;

b. E comprises a second isocyanate-functional polyurethane prepolymer obtained by reacting a second polyol component with a second at least difunctional isocyanate, wherein the isocyanate groups of the second polyurethane prepolymer have a higher reactivity to isocyanate-reactive groups than the predominant isocyanate groups of component D;

c. F comprises a third at least difunctional isocyanate which does not contain a nitrogen atom that is not part of an NCO group or a mixture of two or more thereof, wherein component F is present in an amount of from 3% by weight to 25% by weight based on the weight of D, E, F and G; and d. G comprises a fourth at least difunctional isocyanate or a mixture of two or more isocyanates with an average functionality of at least two, at least one isocyanate containing at least one nitrogen atom that is not part of an NCO group or urethane group; wherein, the quantity of component G on completion of mixing and after all the reactions, if any, taking place between components D, E, F and G have ended, is at least 5% by weight based on the weight of D, E, F and G and the binder has a viscosity at 50° C. less than 5,000 mPas (as measured by a Brookfield RVTDV II viscometer, spindle 27, 20 r.p.m.).

16. A member selected from the group consisting of adhesives, coatings, emulsion paints, casting resins, moldings and film laminates comprising the composition of claim 1.

17. An adhesive containing two components H and I, wherein

H comprises a polyurethane binder according to claim 1; and

I comprises a compound containing at least two functional groups reactive with isocyanate groups of component H having a molecular weight of up to 50,000 or a mixture of two or more such compounds.

18. The adhesive as claimed in claim 17, wherein I comprises a polyol containing at least two OH groups.

19. The adhesive as claimed in claim 17 wherein component I is present in such a quantity that the ratio of isocyanate groups of component H to functional groups reactive with isocyanate groups of component H, in component I, is from 5:1 to 1:1.

20. The adhesive as claimed in claim 17 having a viscosity of 500 to 10,000 mPas (as measured by a Brookfield RVTDV II viscometer, Spindle 27, 20 r.p.m., 40° C.).

21. The polyurethane binder of claim 1 wherein component B is present at 10% to 25% by weight of the binder and component C is present at from 5% to 10% by weight of the binder.

22. The polyurethane binder of claim 1 wherein component B is present at from 5% to 25% by weight of the binder.

23. The polyurethane binder of claim 1 wherein component C is present at from 10% to 40% by weight based on the weight of the binder.

24. The adhesive of claim 20 wherein the viscosity is from 500 to 6,500 mPas.

* * * * *

UNITED STATES PATENT AND TRADEMARK OFFICE
CERTIFICATE OF CORRECTION

PATENT NO. : 6,809,171 B2
DATED : October 26, 2004
INVENTOR(S) : Bolte et al.

It is certified that error appears in the above-identified patent and that said Letters Patent is hereby corrected as shown below:

<u>Column 19,</u>
Line 56, delete "en" and insert -- an --.
Line 67, delete "isocyariate-reactive" and insert -- isocyanate-reactive --.

Signed and Sealed this

Eleventh Day of April, 2006

JON W. DUDAS
*Director of the United States Patent and Trademark Office*